United States Patent
Hawkins

(10) Patent No.: US 6,302,356 B1
(45) Date of Patent: Oct. 16, 2001

(54) HELICOPTER TWO STAGE MAIN REDUCTION GEARBOX

(75) Inventor: John M. Hawkins, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/378,195

(22) Filed: Aug. 20, 1999

Related U.S. Application Data

(60) Provisional application No. 60/097,484, filed on Aug. 21, 1998.

(51) Int. Cl.$^7$ .................................................. B64C 27/12
(52) U.S. Cl. ........................ 244/17.11; 244/60; 416/170 R
(58) Field of Search .................................... 244/17.11, 60; 475/331, 338, 336, 348, 903; 416/170 R; 74/665 A, 665 C, 416

(56) References Cited

U.S. PATENT DOCUMENTS

| | | | |
|---|---|---|---|
| 798,907 | 9/1905 | Knudsen | 74/410 |
| 1,195,119 | 8/1916 | Westinghouse | 74/410 |
| 2,270,567 | 1/1942 | Slider | 74/312 |
| 2,313,183 | 3/1943 | Trbojevich | 74/303 |
| 2,908,187 | 10/1959 | Saari | 74/665 |
| 2,911,851 * | 11/1959 | Wachs | 244/60 |
| 2,924,998 | 2/1960 | Sem et al. | 74/801 |
| 2,951,395 | 9/1960 | Smith et al. | 74/606 |
| 2,954,704 | 10/1960 | Saari | 74/466 |
| 3,129,608 | 4/1964 | Watson | 74/665 |
| 3,255,825 * | 6/1966 | Mouille et al. | 244/60 |
| 3,382,838 | 5/1968 | Bergstedt | 115/35 |
| 3,564,937 | 2/1971 | Soloviev et al. | 74/661 |
| 3,602,068 | 8/1971 | White | 74/674 |
| 3,782,223 | 1/1974 | Watson | 74/665 |
| 3,871,248 | 3/1975 | Barish | 74/665 |
| 3,977,632 | 8/1976 | Watson | 244/60 |
| 4,043,216 | 8/1977 | Steer | 74/410 |

(List continued on next page.)

FOREIGN PATENT DOCUMENTS

| | | |
|---|---|---|
| 1042388 | 10/1958 | (DE) . |
| 1406481 | 5/1969 | (DE) . |
| 652.043 | 3/1929 | (FR) . |
| 58196348 | 11/1983 | (JP) ................................ F16H/1/28 |
| 8800415 | 9/1989 | (NL) . |
| WO 92/18279 | 10/1992 | (WO) . |

OTHER PUBLICATIONS

*Cylkro Gears®—A New Challenge*, Guus Basstein, 4 pgs.
*Computer Methods In Applied Mechanics and Engineering*, I.H. Seol & F.L. Litvin, Department of Mechanical Engineering, Univ. of Illinois at Chicago, Chicago, IL, Nov. 1, 1995, pp. 73–103.
*Gears and Gear Manufacture—The Manufacture*, Richard H. Ewert, Chapman & Hall, New York, pp. 2–32.
*Gear Geometry and Applied Theory*, Faydor L. Litvin, Prentice Hall, New Jersey, 1994, Chapter 9, pp. 258–287.
*Gear Geometry and Applied Theory*, Faydor L. Litvin, Prentice Hall, New Jersey, 1994, Chapter 11, pp. 490–525.
Bell OH–58 Helicopter Transmission, NASA Technical Memorandum 82857, 1982, Fig. 5.
Involute Contrate Gears (Face Gears), pp. 90–93 (printed on 2 sheets).

Primary Examiner—Galen L. Barefoot
(74) Attorney, Agent, or Firm—Woodard, Emhardt, Naughton, Moriarty & McNett

(57) ABSTRACT

A twin turbine engine helicopter has a two-stage main reduction gearbox, the input stage having a speed reduction ratio exceeding 5.5:1, into an epicyclic gear train second stage ratio about 6:1 for approximately 30:1 or higher overall ratio output to the main rotor. In various embodiments, the first stage uses face gears, or bevel gears, with a reduction greater than 5.5:1 and a second stage epicyclic gear train using single or double row helical or spur gears. The first stage gears are straddle mounted in the housing.

15 Claims, 5 Drawing Sheets

U.S. PATENT DOCUMENTS

| | | | |
|---|---|---|---|
| 4,068,470 | 1/1978 | Sargisson et al. | 60/226 R |
| 4,251,987 | 2/1981 | Adamson | 60/39.75 |
| 4,484,491 | 11/1984 | Cocking | 74/606 |
| 4,486,051 | 12/1984 | Becker | 299/78 |
| 4,489,625 * | 12/1984 | White | 244/60 |
| 4,682,512 | 7/1987 | Peterson | 74/410 |
| 4,744,263 | 5/1988 | Kuiken | 74/462 |
| 4,811,627 * | 3/1989 | Mouille | 244/60 |
| 4,829,850 | 5/1989 | Soloy | 74/665 |
| 4,899,609 | 2/1990 | Nagata | 74/462 |
| 4,983,153 | 1/1991 | Luijten | 475/343 |
| 5,108,043 | 4/1992 | Canavespe | 244/17.11 |
| 5,114,287 | 5/1992 | Ervay et al. | 409/13 |
| 5,135,442 | 8/1992 | Bossler, Jr. | 475/1 |
| 5,149,311 | 9/1992 | Luijten | 475/343 |
| 5,178,028 | 1/1993 | Bossler, Jr. | 74/416 |
| 5,189,929 | 3/1993 | Chory | 74/606 |
| 5,233,886 | 8/1993 | Bossler, Jr. | 74/665 |
| 5,247,856 | 9/1993 | Cuypers | 74/665 |
| 5,271,289 | 12/1993 | Baxter, Jr. | 74/462 |
| 5,472,385 | 12/1995 | Vu | 475/251 |
| 5,472,386 * | 12/1995 | Kish | 244/60 |
| 5,537,889 | 7/1996 | Shigeura et al. | 74/464 |
| 5,572,910 | 11/1996 | Tomaselli et al. | 74/665 |
| 5,782,433 | 7/1998 | Goi et al. | 244/60 |
| 5,797,185 * | 8/1998 | Sammatero et al. | 244/60 |
| 5,807,202 * | 9/1998 | Sammatero | 244/60 |

* cited by examiner

HELICOPTER TWO STAGE MAIN REDUCTION GEARBOX

This application claims the benefit of United States provisional patent application No. 60/097,484 filed on Aug. 21, 1998. The content of that application is incorporated herein by reference.

BACKGROUND OF THE INVENTION

The present invention relates generally to the design and construction of a speed reduction gearbox for transmission of power from a gas turbine engine to a helicopter rotor. More particularly, the present invention relates to a two-stage reduction main gearbox for a twin-engine helicopter.

To use gas turbine engines to drive helicopters, it requires speed reduction gearboxes between the engines and the helicopter rotors. This is true because gas turbine engines are high speed rotary equipment having components including an output shaft revolving at speeds from about 5,000 to 50,000 revolutions per minute. Many modern helicopters have two horizontally-spaced gas turbine engines with parallel, horizontally-spaced output shafts. To deliver the power from the output shafts of both engines to the main rotor, right-angle, speed-reducing "nose" gearboxes are used, each having an input shaft coupled to an engine output shaft. Each nose gearbox has an output shaft. A main gear reduction gearbox is coupled to the nose gearbox output shafts to harness the power from both engines, provide further speed reduction and increase output torque. Main gear reduction gearboxes include gear sets therein for reducing the shaft speed during the transmission of power from the nose gearboxes to the output devices. The transmission of power from the gas turbine engines to the output devices, which include the main rotor, the tail rotor, and various accessories, imparts substantial loads on the bearings and gears of the main reduction gearbox.

The application of gas turbine engines as a propulsion means for a helicopter often creates design parameter conflicts, such as the need for a durable long life gear train and the necessity to minimize the volume and weight of the transmission. Prior designers of gas turbine engine gear reduction gearboxes for helicopters have generally used multi-stage, main reduction gearboxes to effectuate significant shaft speed reduction. For smaller helicopters, two-stage reductions have been used. The first stage reduction has been limited to an input/output speed ratio of 5 to 1, i.e. 5:1. To the best of my knowledge, that has been the maximum first-stage reduction ratio considered acceptable in the helicopter industry. In efforts to deal with that limitation, and handle greater power inputs as developed by more powerful engines for larger helicopters, the typical practice has been to provide additional stages of gear reduction in the main gearbox. While a second stage has been acceptable for small helicopters, addition of a third stage has been the usual direction taken to handle larger helicopters with more powerful engines. Another approach has been to work within the generally-accepted 5:1 first stage reduction limit, by using a torque-splitting technique, but with attendant weight and cost penalties. Also, depending upon the proposed torque-splitting arrangement, failure to achieve true 50—50 torque splitting can result in overloading one of the two power paths, with attendant early gear failure.

The present invention is addressed to the continuing need for a simpler and lighter helicopter gearbox for handling more power.

SUMMARY OF THE INVENTION

One form of the present invention contemplates a combination comprising: a helicopter having a main rotor; a pair of gas turbine engines mounted to the helicopter, each engine of the pair of gas turbine engines having a first power output shaft; a pair of nose gearboxes mounted to the helicopter, each gearbox of the pair of nose gearboxes having an input coupled to one of the first power output shafts, and each gearbox of the pair of nose gearboxes having a second power output shaft; and a two stage main reduction gearbox mounted to the helicopter and having a first stage coupled with said second power output shafts and a second stage coupled with said main rotor, wherein said first stage defines a face gear reduction greater than 5:1 and said second stage defines an epicyclic gear train reduction to the helicopter rotor.

Another form of the present invention contemplates a combination comprising: a helicopter having a main rotor; a pair of gas turbine engines mounted to the helicopter, each engine of the pair of gas turbine engines having a first power output shaft; a pair of nose gearboxes mounted to the helicopter, each gearbox of the pair of nose gearboxes having an input coupled to one of the first power output shafts, and each gearbox of the pair of nose gearboxes having a second power output shaft; and a two stage main reduction gearbox mounted to the helicopter and having a first stage coupled with said second power output shafts and a second stage coupled with said main rotor, wherein said first stage defines a bevel gear reduction greater than 5.1 and said second stage defines an epicyclic gear train reduction to the helicopter rotor.

Yet another form of the present invention contemplates a combination comprising: a helicopter having a main rotor; a pair of gas turbine engines mounted to the helicopter, each engine of the pair of gas turbine engines having a first power output shaft; a pair of nose gearboxes mounted to the helicopter, each gearbox of the pair of nose gearboxes having an input coupled to one of the first power output shafts, and each gearbox of the pair of nose gearboxes has a second power output shaft; and a two stage main reduction gearbox mounted to the helicopter and having a power input portion first stage reduction and a power output portion second stage reduction, the power input portion coupled to the pair of second power output shafts and providing a speed reduction ratio greater than 5:1, the power output portion being coupled to the main rotor.

One object of the present invention is to provide a helicopter having a two-stage main reduction gearbox handling more power from engines to main rotor than has been considered feasible heretofore.

DESCRIPTION OF THE PREFERRED EMBODIMENT

Figure 1:
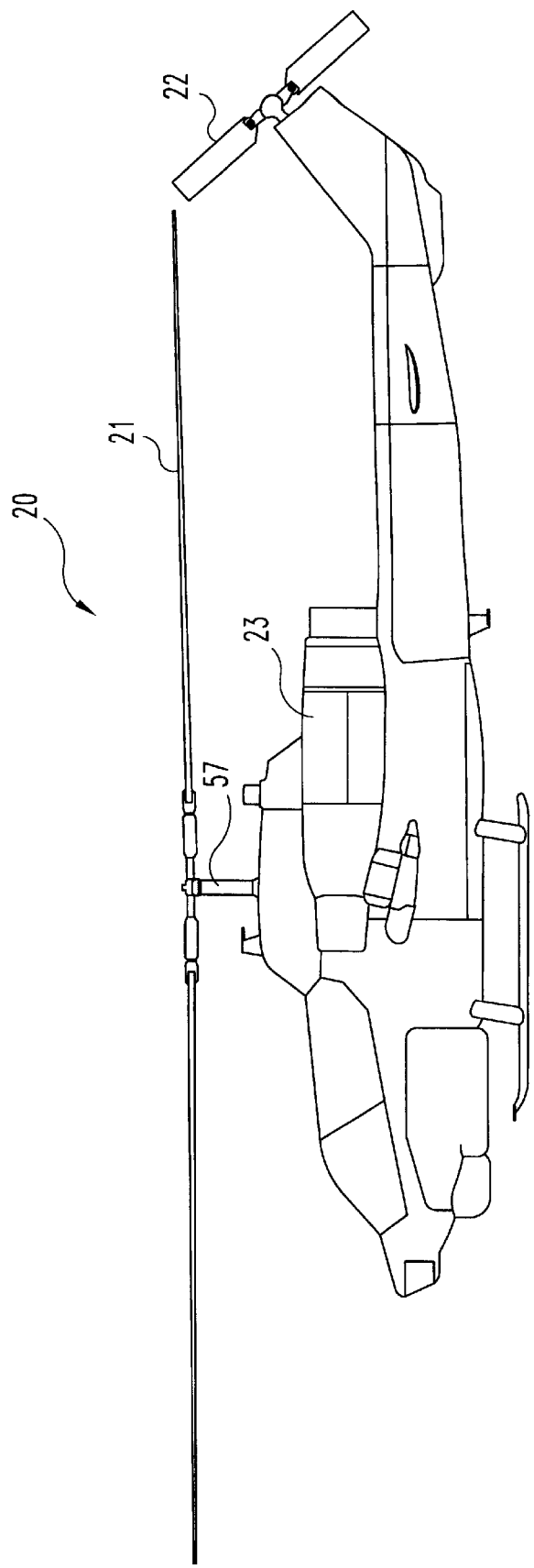
FIG. 1 is a schematic side elevational view of a helicopter incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a side elevational view of a helicopter 20. The helicopter 20 includes a main rotor 21 and a tail rotor 22. A pair of gas turbine engines 23 drives the rotors 21 and 22. The present invention is applicable to a wide variety of helicopters, including the McDonnell Douglas Apache.

Figure 2:
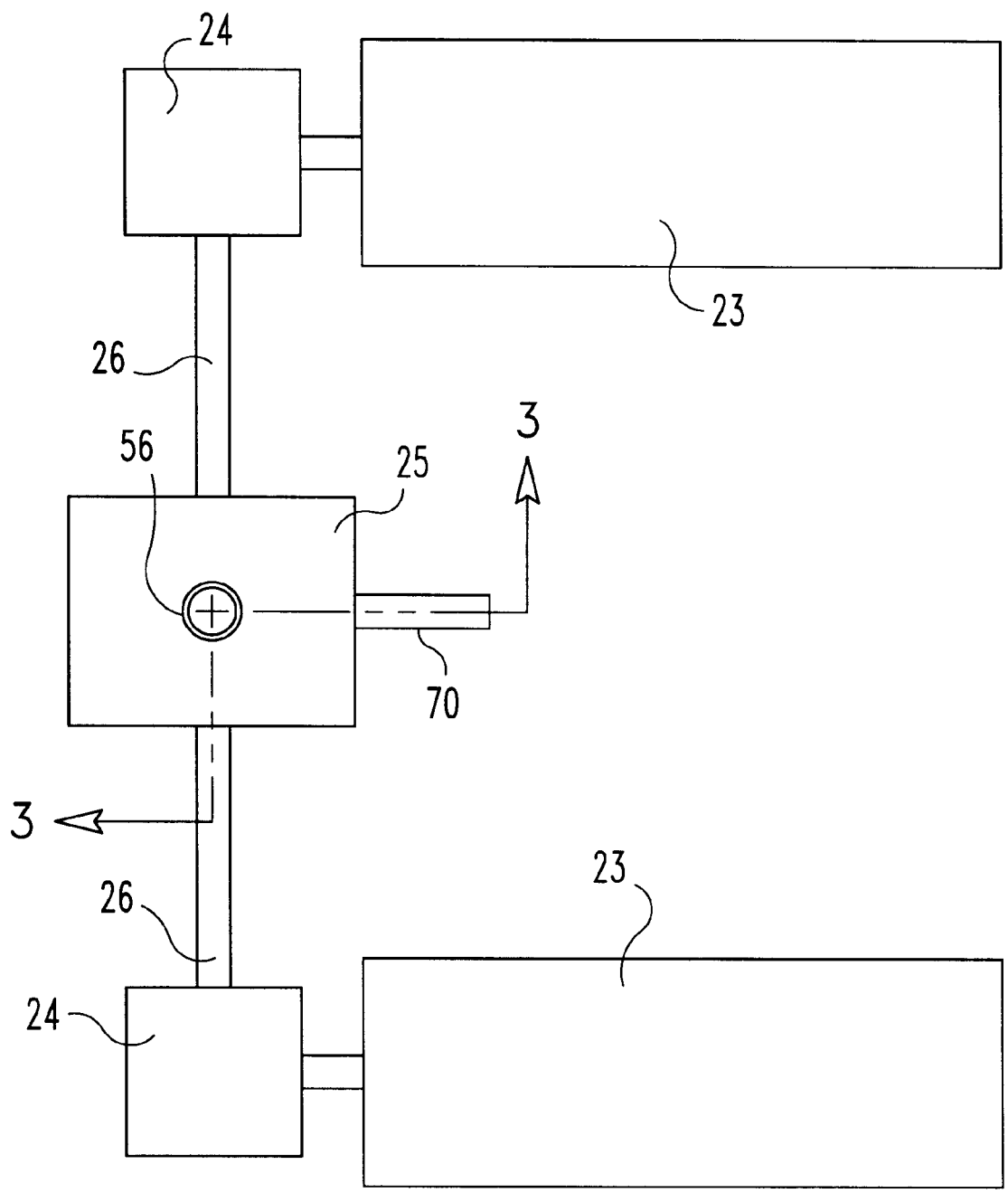
FIG. 2 is a block diagram of the organization from the engines to the main reduction gearbox.

With reference to FIG. 2, there is illustrated a block diagram of one embodiment of the propulsion system for the helicopter 20. A pair of horizontally-spaced gas turbine engines 23 is provided, each having an output shaft coupled to a speed-reducing, right angle nose gearbox 24. A main reduction gearbox 25 has inputs oriented at 180° from each other and coupled to output shafts 26 from the nose gearboxes 24.

Typically, each gas turbine engine 23 includes a compressor, combustor, a power turbine and an assortment of accessories. A person of ordinary skill in the art will appreciate that there are multitudes of ways to link the components, from engine to main reduction gearbox, together so detailed description is not needed here.

For the illustrated example, each engine nose gearbox 24 can be designed to accept a maximum continuous horsepower rating of 2350 hp. Speed reduction in the nose gearbox of 2.13:1 for an engine speed of 21,160 rpm would produce an output speed, into the main gearbox 25, of 9,934 rpm. It is possible that a single nose gearbox can be designed to accept power from both engines, with corresponding benefits in manufacturing, spares, and maintenance costs.

The main reduction in gearbox 25 is two stage for minimum weight, with helical gearing (or high contact ratio gears) in both stages to minimize vibration and enhance reliability. There is no-torque splitting at the first stage.

Figure 3:
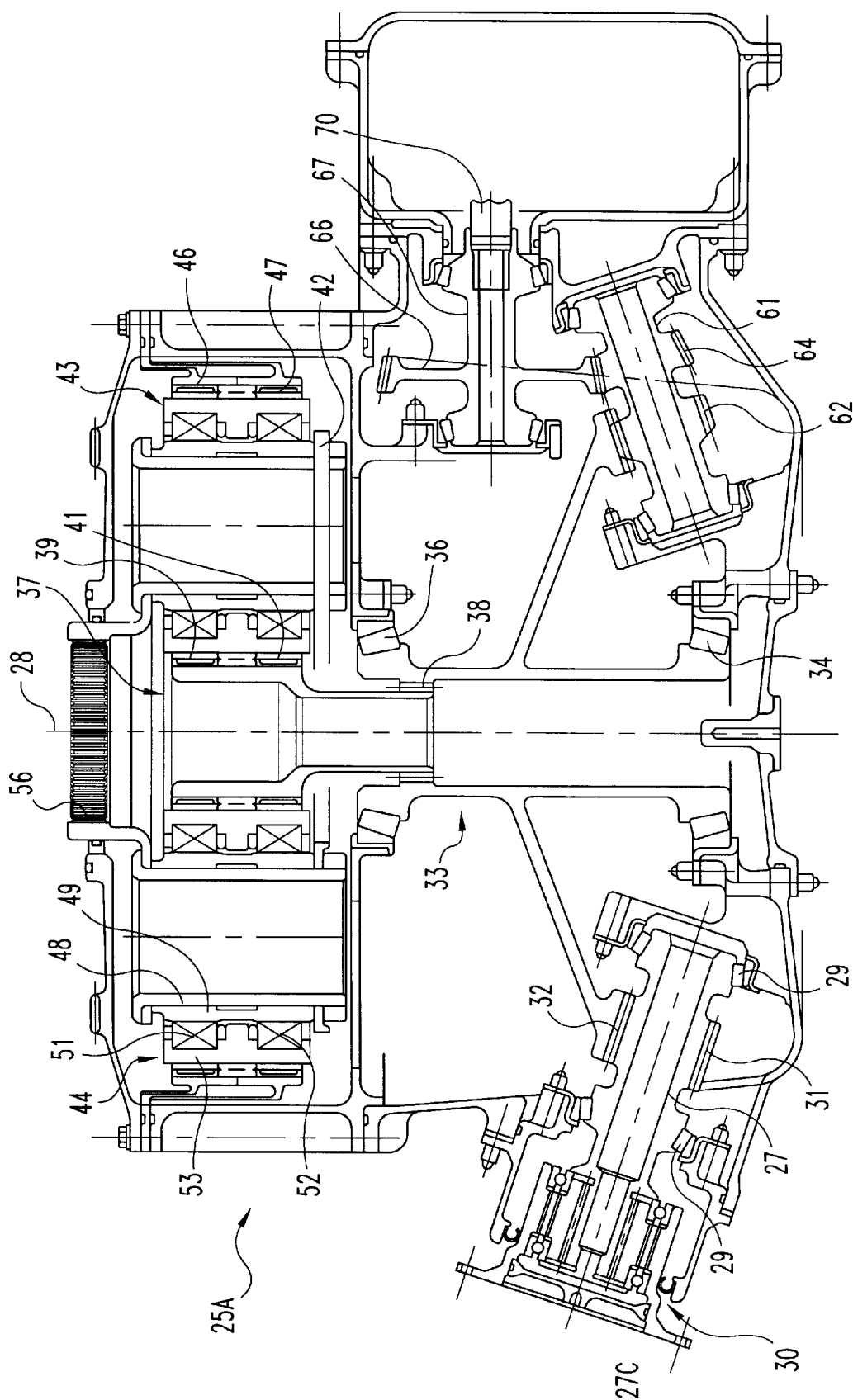
FIG. 3 is a vertical section through the main reduction gearbox according one embodiment of the present invention, the section being taken at line 3—3 in FIG. 2 and viewed in the direction of the arrows. This embodiment employs a face gear reduction as the first stage and a double helical epicyclic gear train output stage.
Figure 4:
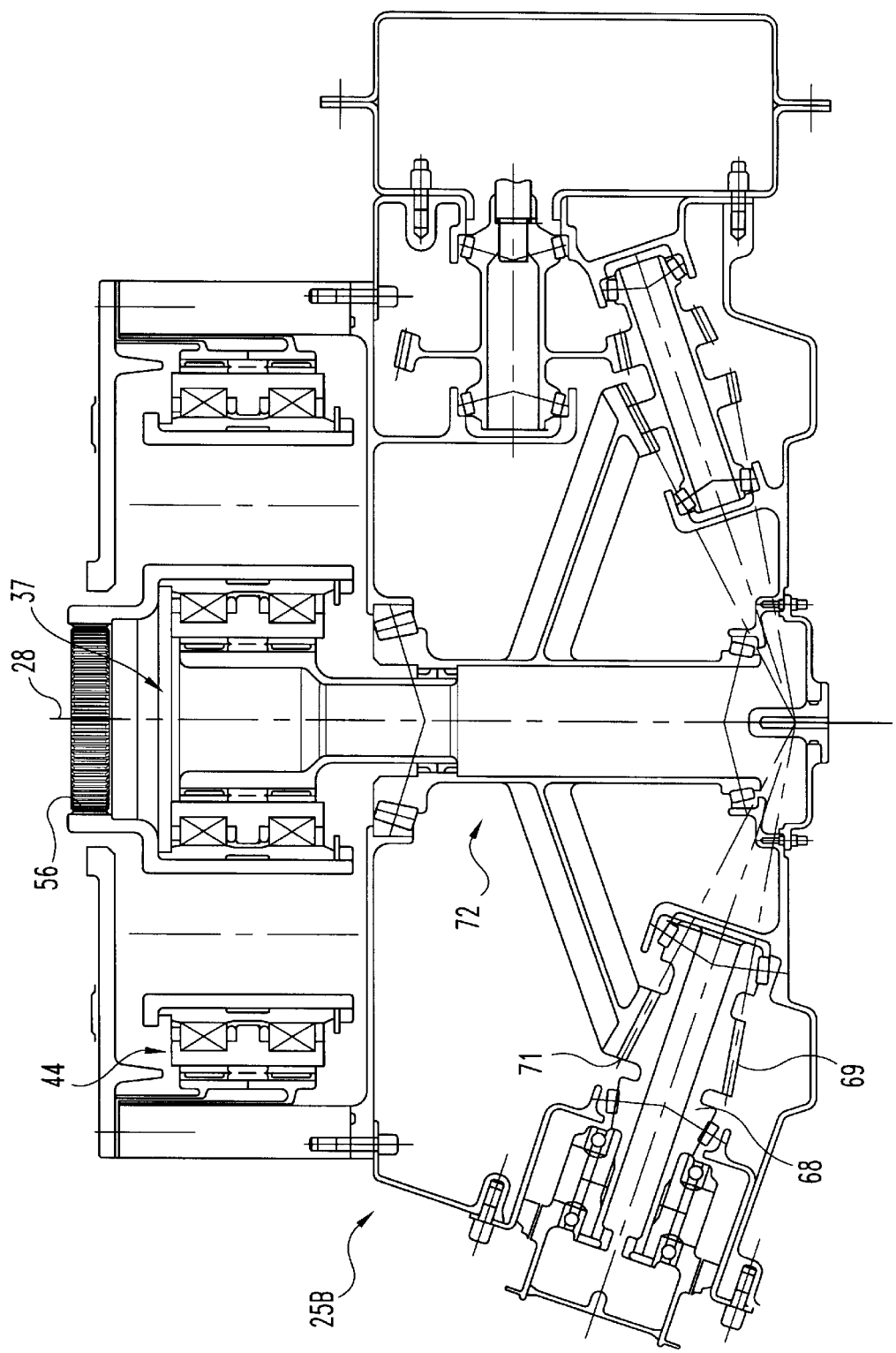
FIG. 4 is a vertical sectional view similar to FIG. 3 but using a bevel gear reduction as the first stage and a double helical epicyclic output stage.
Figure 5:
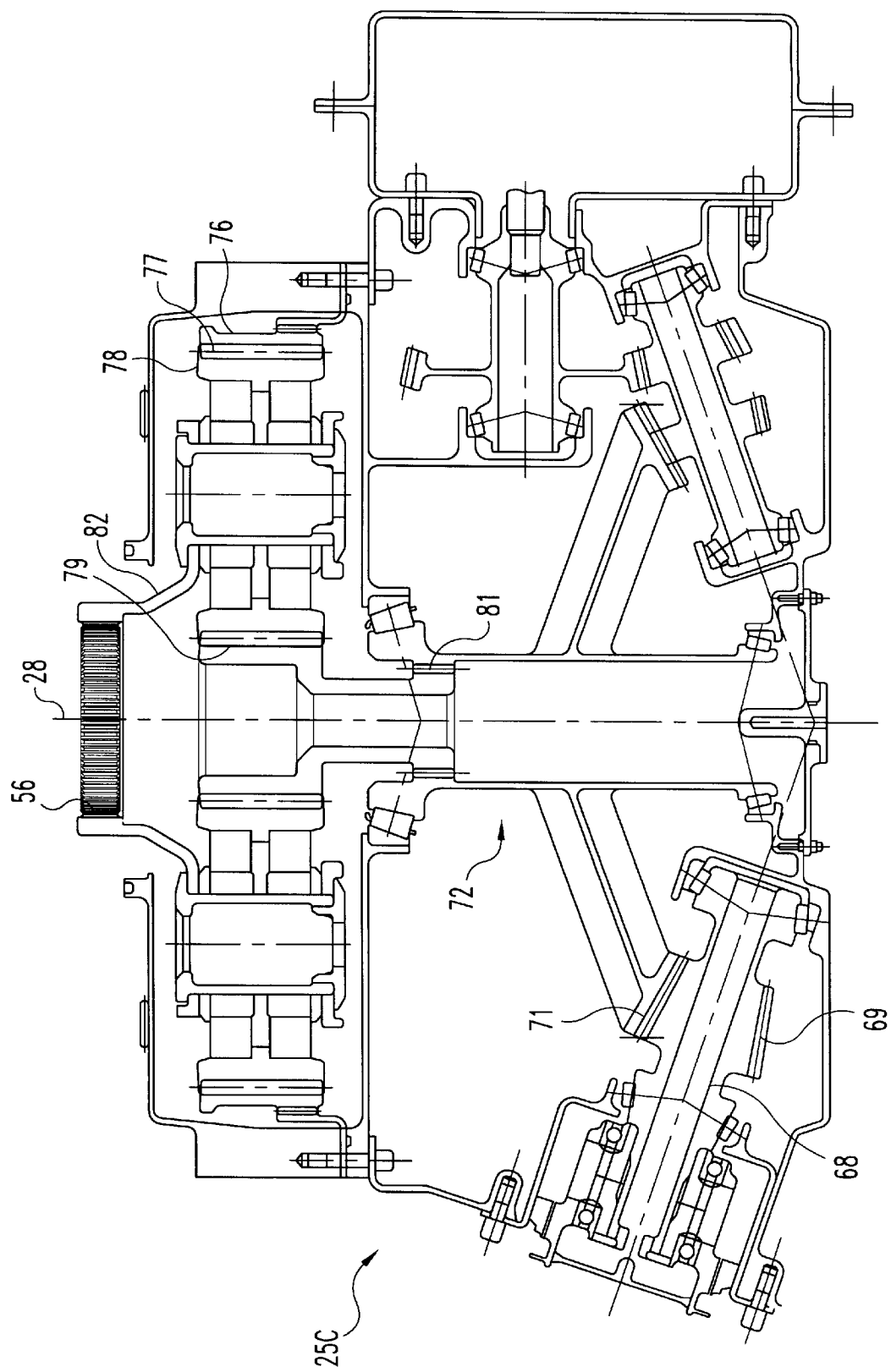
FIG. 5 is a third embodiment of the invention employing a bevel gear first stage and a single helical epicyclic output stage.

Referring now to FIGS. 3–5, FIG. 3 shows a face gear reduction as the first stage, and a double helical epicyclic output. FIG. 4 shows a bevel gear, first stage input reduction, and a double helical epicyclic output. FIG. 5 shows a bevel gear, first stage input reduction, and a single helical epicyclic output.

Referring further to FIG. 3, gearbox 25A has a power input shaft 27 receiving engine power from one of the nose box shafts 26 delivered through a one-way overrunning clutch 30. A sprag-type clutch is preferred, but other types might be used as well. Some intermediate shafting and universal joints may be used in the coupling, if necessary, depending upon orientation and location of the nose box output shafts relative to the main transmission gearbox 25A. The power input shaft in the gearbox 25A from the other engine nose gearbox is not shown in FIG. 3, due to the location of the drawing cutting plane. It is indexed 180° around the vertical axis 28. For convenience, as illustrated in FIGS. 3–5, the accessory output is shown at the 180° location instead of its actual 90° orientation shown in FIG. 2. Shaft 27 is mounted in two tapered roller bearing assemblies 29 mounted in the gearbox. So face gear 31 on shaft 27 is straddle-mounted between bearing sets 29. It is in mesh with the face gear 32 on an intermediate drive member 33, which is also mounted in the gearbox by tapered roller bearings 34 at the bottom and 36 at the top for rotation of member 33 about the axis 28.Thus gear 32 is also straddle-mounted between its support bearings.

A torque transmitting tube 37 is splined adjacent its bottom 38 to the intermediate member 33 and has two rings 39 and 41 of helical gear teeth near its upper end. These teeth provide the "sun" member of the epicyclic gear train which includes a gear carrier 42, planet gears 43 and 44, and a ring gear which, in this embodiment, includes two rings of helical teeth 46 and 47. It should be understood that additional planet gears mounted on the carrier in circularly spaced relationship about the axis 28 complete the epicyclic gear train. For each of them, a hub 48 fixed to the carrier supports an inner race 49 of a double-row roller bearing set whose rollers 51 and 52 support the outer race 53. Two rings of helical gear teeth are mounted on race 53 and mesh with the rows 39 and 41 of helical teeth on the sun gear and rows 46 and 47 of the ring gear. In this particular embodiment of the invention, the carrier 42 serves as the output member, having internal splines 56 for coupling to the helicopter main rotor shaft 57 (FIG. 1) It should be understood with respect to this and the other two embodiments of the invention to be described, it is preferred that the carrier be the output member. However, if a lesser reduction is acceptable in the second stage, the carrier can be fixed to the housing and the ring gear can be supported on suitable bearings for rotation in the housing, and used as the output member.

Also, it should be understood that for the three embodiments, as suggested above, the power input shaft from the other engine nose gearbox, is situated the same as shown for the one, except oriented 180° about axis 28, and drives the gear in the same way. A further shaft 61 is mounted in tapered roller bearings in the gearbox in a manner similar to that of power input shaft 27 and has gear 62 thereon meshing with the gear teeth 32 of the intermediate member 33. This shaft 61 has gear 64 thereon meshing with the gear 66 on accessory output driver 67 to which accessory output shaft 70 is splined to power the tail rotor and accessories.

Referring now to FIG. 4, the overall organization is similar to that of FIG. 3. Therefore, some of the components performing the same general functions or having the same general orientations, are given the same reference numerals as in FIG. 3. But in this case, instead of the power input shaft 68 having a face gear thereon, it has a face-milled or face-hobbed bevel gear 69 thereon engaging the face-milled or face hobbed bevel gear 71, respectfully, of the intermediate member 72. Because of the fact that the face-milled or face-hobbed bevel gear is expected to handle higher loads than face gears such as 31–32 of the FIG. 3 embodiment, this FIG. 4 embodiment may be preferred if it can be more compact for a given power handling capability, than can the FIG. 3 embodiment.

Referring now to FIG. 5, this embodiment is similar to that of FIGS. 3 and 4 but, in this case, the ring gear 76, affixed to the gearbox, has only a single ring 77 of helical teeth thereon. Accordingly, so do the planets 78 have only a single set of helical teeth thereon engaging the ring gear 76 and engaging the sun gear 79 which is splined at 81 to the intermediate member 72. The carrier 82 is provided with internal splines 56 to provide the output to the rotor shaft 57.

In the foregoing description bearings for the carriers, lubrication, seals and other various internal details have been omitted from the FIGS. to avoid undue complexity in the drawings, and are considered within the skill of the art.

According to the present invention, for the embodiment of FIG. 3, skive finished face gears from Crown Gear B.V. in the Rotterdam, Netherlands are preferred. Also, regarding the FIG. 3 embodiment, the second stage reduction is an epicyclic train. It can be of the planetary reduction type with the carrier as the output as shown, or a star reduction type with the carrier held and the ring gear rotating as the output. High contact ratio spur gear can be used in the epicyclic set, as an alternative to bevel gears. In all three embodiments, the accessory drive taken directly off the face or bevel gear on the intermediate member, is useful for drive of the tail rotor 22.

With further reference to FIG. 3, use of a single face gear mesh as the input stage, and a planetary arrangement as the output stage, allows for a gear arrangement that meets the space and weight requirements, and can be produced economically. The ratio split is adjusted to shift more of the reduction to the planetary to allow the face gear to fit within the required envelope and to minimize weight. Size and weight of the gearbox will be strongly affected by the type of first-stage reduction. For example, Table 1 presents a summary of the effect great types and usage on outside diameter. The bevel gear arrangement of FIGS. 4 and 5 enables use of a smaller diameter. Table 2 summarizes the tooth stresses of the different designs. In these tables, Gleason refers to the Gleason Works, of Rochester, N.Y. Crown gear refers to the above mentioned Netherlands company. ISO is the International Standards Organization. 1 ksi is 1000 pounds per square inch.

TABLE 1

Summary of the effect on outside diameter.

| Gear type | Outside diameter, in. | |
|---|---|---|
| Single bevel gear | 21.6 | Gleason analysis |
| Single face gear | 25.5 | Crown Gear analysis |
| Split torque face gear | 21 | Crown Gear analysis |

TABLE 2

Summary of the tooth stresses of the different designs.

| Gear type | Diametral pitch | No. of teeth | Bending stress, ksi | Compressive stress, ksi |
|---|---|---|---|---|
| Bevel gear | 7.0 | 25/151 | 36/24 Gleason | 221 Gleason |
| Single face gear | 6.35 | 18/109 | 56 ISO | 160 ISO |

A summary of the tradeoffs (see Tables 3 and 4) for the basic planetary designs that may be considered for the planetary follows:

1. Double helical—Excellent noise control. A high helix angle gives good overlap ratio. This approach makes the planet bearing less complex than the single helical design.
2. Single helical—good noise control, but wider width due to bearings required, unless tapered roller bearings are used. A low helix angle is used to reduce the overturning moment on the bearings.
3. High contact ratio (HCR) spur—Small envelope, lightest overall weight, good noise reduction achieved, simple bearings.

TABLE 3

Planetary data

| Type | Diametral pitch | Helix angle, deg | Face contact ratio |
|---|---|---|---|
| Double helical | 6.35 | 25 | 3.2 |
| Single helical | 5.80 | 9 | 1.08 |
| HCR spur | 5.70 | 0 | 0 |

An example of weighting of the FIGS. 3 and 4 compared with the FIG. 5 planetary arrangement is in Table 4. It is understood that the planetary is the main source of helicopter cabin noise. One solution is to use a double helical planetary. A second choice is to use a single helical design. If a high contact ratio spur gear planetary is used, a pressure angle closer to 20 degrees is preferred, for a resulting minimum contact ratio around 2.05. Use of 30 teeth on the sun gear is sufficient to achieve this contact ratio.

TABLE 4

Relative weighting.
(1–10, higher is better)

| | Light weight | Cost | Noise control | Space envelope | Bearing simplicity | Total |
|---|---|---|---|---|---|---|
| Double helical | 5 | 3 | 10 | 5 | 5 | 28 |
| Single helical | 6 | 4 | 8 | 7 | 3 | 30 |
| HCR spur | 6 | 5 | 7 | 7 | 5 | 30 |
| Standard spur | 5 | 5 | 5 | 5 | 5 | 25 |

The single helical design has an overturning moment on the planetary gear. This moment must be reacted by the planet bearings. This can be achieved by either spreading the bearing, which is not desirable from a space standpoint, or by using tapered roller bearings, e.g., a single cross row tapered roller.

A tooth count of 30-54-138 was used to size the planetaries. Simultaneous meshing of the planets is avoided, although sequential meshing is not achieved. Alternating contact of the planets is believed to be as good as sequential meshing for noise reduction. Four planets will fit into the 5.60 to 1 reduction ratio. The gears would be counterphased—the start of mesh at the sun/planet contacts would be offset from the start of mesh at the planet/ring mesh. Ring gear pitch diameter is approximately 24 in. for all three designs. Face width is the same at 3.80 in. for all three. Therefore, power density is almost the same for all three designs.

Regarding face gears for the FIG. 3 embodiment American Gear Manufacturers Association (AGMA), quality 11-12 is achievable with face gears from Crown Gear in Holland. Higher quality is achievable with grinding. If grinding is desired, Crown Gear would suggest grinding face gears using a Reishauer type of grinder, with a grinding wheel shaped the same as their toroidal hobs.

FIGS. 3–5 show the first stage gears 32 and 71 supported on tapered roller bearings. Preferably these bearings would be mounted into the housing with steel liners. The bearings would be spring loaded. Most bearings in the gearbox could be made from AMS 6491 (M-50 VIM-VAR) steel. But Timken Company in Canton, Ohio, has been achieving good oil-off capabilities, with bearings that are made of their CBS 600 steel. That material is also believed preferable for all gears herein. Pyrowear X-53 also may be used for the gears. Pyrowear 675 may be used for bearing parts.

An oil in temperature of 230° F. is acceptable, but it is believed currently that the scavenge temperature needs to be limited to approximately 330° F. This is because the peak metal temperatures in both bearings and gears are higher than the bulk scavenge temperature.

The main rotor transmission should use conventional lubrication and cooling system design practices, but with U.S. Marine Corps approved gear oil, per DOD-L-85734. This allows for large increases in gear and bearing pitting lives that are required to meet the 5000 operating hours mean time between failures under the DT 2000 performance goals. This oil also allows the transmission to run at hotter temperatures.

Another technology that offers potential to decrease the weight of the main rotor transmission is the reduction of the gear mesh losses, which constitute over 70% of the heat generated in the lubrication system, by reducing gear mesh friction with low cost gear coatings and reducing oil churning losses through oil supply optimization. The introduction of hybrid ceramic bearings ($Si_3N_4$ rolling-elements and bearing steel races) into the main rotor transmission may offer the advantages of lighter weight, reduced operating bearing parasitic losses, and extended bearing operating times under emergency oil-off conditions, an important vulnerability advantage. The promising potential for hybrid bearing usage in helicopter main rotor transmissions was revealed in the NASA/ARL ART program.

Face seals are preferred at high-speed locations (10,000 ft./min. surface speeds), and lip seals at locations below 10,000 ft/min surface speed. Magnetic face seals or conventional pusher type face seals may be used.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination, comprising:
    a helicopter having a main rotor;
    a pair of gas turbine engines mounted to said helicopter, each engine of said pair of gas turbine engines having an engine power output shaft;
    a pair of nose gearboxes mounted to said helicopter, each nose gearbox of said pair having an input coupled to one of said engine power output shafts, and each nose gearbox of said pair having a power output shaft; and
    a two stage main reduction gearbox having a first stage power input portion and a second stage power output portion, said power input portion being coupled to said power output shafts of said nose gearboxes, and said power output portion being coupled to said main rotor;
    said power input portion having a gear reduction first stage speed ratio exceeding 5.5 to 1.

2. The combination of claim 1 and wherein the main reduction gearbox further comprises:
    a housing mounted to said helicopter;
    a power output member rotatably mounted in said housing and having a rotational output axis;
    a power input member mounted in said housing and having a rotational input axis, said input member having a first gear pinion thereon rotating on said input axis;
    a first intermediate drive member rotatable about said output axis and having a second gear thereon meshing with and driven by the pinion on the input member, the speed-ratio between the pinion on said input member and the second gear exceeding 5.5 to 1;
    a sun gear on said intermediate member;
    a gear carrier mounted in said housing,
    a plurality of gears rotatably mounted on said carrier about a plurality of rotational axes parallel to said output axis and circularly spaced in a circle about said output axis;
    a ring gear in said housing and surrounding said carrier;
    one of said ring gear and said carrier being fixed to said housing, and the other of said ring gear and said carrier serving as said output member, being rotatable on said output axis.

3. The combination of claim 2 and wherein:
    said carrier-mounted gears meshed with said sun gear and said ring gear and cooperating with them and the input member, are sized and provided with tooth counts and controlled whereby the speed ratio of the input member to the output member exceeds 30 to 1.

4. The combination of claim 2 and further comprising:
    one-way overrunning clutches mounted on said housing and coupled between said power input member and said power output shafts from said nose gearboxes and oriented to transmit power to said power input member from said nose gearboxes.

5. The combination of claim 2 and wherein:
    the first gear on the input member and the second gear are face gears.

6. The combination of claim 2 and wherein:
    the first gear on the input member and the second gear are face-milled or face-hobbed bevel gears.

7. The combination of claim 2 and wherein:
    each carrier-mounted gear has two rows of helical teeth thereon meshing with two rows of helical teeth on said sun gear.

8. The combination of claim 2 and wherein:
    each carrier-mounted gear has a single set of helical teeth.

9. The combination of claim 2 and further comprising:
    first and second sets of tapered roller bearings mounted in said housing,
    said power input member being rotatably supported by said bearings, with said pinion straddle mounted between said first and second sets.

10. The combination of claim 9 and further comprising:
    third and fourth sets of tapered roller bearings mounted in said housing, said second gear being rotatably supported by said third and fourth sets, and said second gear being straddle mounted between said third and fourth sets.

11. The combination of claim 10 and wherein:
    said tapered roller bearing sets are pressed into said housing.

12. The combination of claim 10 and further comprising:
    additional sets of bearings mounted on said carrier,
    said additional sets rotatably mounting said carrier-mounted gears on said carrier.

13. The combination of claim 12 and wherein:
    the bearings in said additional sets are cylindrical roller bearings.

14. The combination of claim 2 and wherein:
    said first gear pinion and said second gear are made of CBS 600 steel.

15. The combination of claim 2 and wherein:
    the number of teeth in the first gear pinion and second gear in mesh provides a speed reduction between 8 and 10 to 1.

* * * * *